United States Patent
Chien

(10) Patent No.: US 6,581,834 B2
(45) Date of Patent: Jun. 24, 2003

(54) IMAGE PROCESSING APPARATUS HAVING SCANNER PORTION AND REMOVABLE CARD READER PORTION

(75) Inventor: Chuwn-Jen Chien, Taipei (TW)

(73) Assignee: Primax Electronics, Ltd. (TW)

( * ) Notice: Subject to any disclaimer, the term of this patent is extended or adjusted under 35 U.S.C. 154(b) by 0 days.

(21) Appl. No.: 10/122,510

(22) Filed: Apr. 15, 2002

(65) Prior Publication Data

US 2003/0075605 A1 Apr. 24, 2003

(30) Foreign Application Priority Data

Oct. 19, 2001 (TW) ........................................ 90125857 A

(51) Int. Cl.[7] ................................................. G06K 7/10
(52) U.S. Cl. ................................... 235/454; 235/472.01
(58) Field of Search ................................. 235/380, 449, 235/454, 486, 472.01, 472.02, 472.03, 487, 375; 250/504 H; 382/313, 314, 315

(56) References Cited

U.S. PATENT DOCUMENTS

| | | | | |
|---|---|---|---|---|
| 4,251,153 A | * | 2/1981 | Levine | 358/401 |
| 5,475,504 A | * | 12/1995 | Ogura et al. | 358/474 |
| 5,521,369 A | * | 5/1996 | Kumar | 235/472.01 |
| 5,532,844 A | * | 7/1996 | Kagami et al. | 358/468 |
| 5,550,938 A | * | 8/1996 | Hayakawa et al. | 382/313 |
| 5,679,943 A | * | 10/1997 | Schultz et al. | 235/472.02 |
| 5,711,516 A | * | 1/1998 | Pan | 271/3.14 |
| 5,973,799 A | * | 10/1999 | Gatto et al. | 358/498 |
| 6,168,077 B1 | * | 1/2001 | Gray et al. | 235/375 |
| 6,222,637 B1 | * | 4/2001 | Ito et al. | 358/1.18 |
| 6,457,640 B2 | * | 10/2002 | Ramachandran et al. | 235/379 |
| 6,525,836 B1 | * | 2/2003 | Ito et al. | 358/1.18 |

* cited by examiner

Primary Examiner—Thien M. Le
Assistant Examiner—Kim Nguyen
(74) Attorney, Agent, or Firm—Madson & Metcalf

(57) ABSTRACT

The image processing apparatus includes a scanner portion and a reader portion. The scanner portion is used for converting an image data of a scanned object into a digital data to be processed by a first computer. The reader portion is detachably installed in a receptacle of the scanner portion for receiving a storage medium with stored data therein, wherein the reader portion has a first connector and a second connector thereon. When the reader portion is installed in the receptacle to be electrically connected with the scanner portion, the data are transferred to the first computer via the scanner portion. When the reader portion is detached from the receptacle and has the second connector thereof electrically connected with a second computer, the data are transferred to the second computer.

11 Claims, 4 Drawing Sheets

IMAGE PROCESSING APPARATUS HAVING SCANNER PORTION AND REMOVABLE CARD READER PORTION

FIELD OF THE INVENTION

The present invention relates to an image processing apparatus, and more particularly to an image processing apparatus having a scanner portion and a removable card reader portion.

BACKGROUND OF THE INVENTION

Digital image capturing apparatuses such as digital image scanners and digital still cameras are widely used to process images. These images are scanned/captured and then digitized for a computer to organize, store, analyze and process their data.

Since a digital still camera is light and portable, and generally used independently, the captured digital data are stored in a removable memory medium installed therein before they are outputted to a computer to be processed. The digital data stored in the removable memory medium can be directly transferred to a personal computer via a data output interface of the digital still camera. Alternatively, the removable memory medium with stored digital data can be detached from the digital still camera, and then inserted into a slot 11 of a card reader 1 shown in FIG. 1. The card reader 1 is electrically connected with a computer for transferring the stored digital data. The standardized memory mediums include but are not limited to CompactFlash card (Compact Flash Association), SmartMedia card (Toshiba Corporation) and Memory Stick (Sony Corporation), etc.

A digital image scanner was developed by integrating a card reading function into a scanner, as can be seen in FIG. 2. Such digital image scanner includes a scanner portion 20 and a card reader portion 21 in a single housing, and uses a common cable 201 to link the two portions to a computer. The scanner portion 20 is utilized to scan images, and the realized digital data would be directly transferred to the computer for being further processed by the computer, or pre-stored in a removable memory medium via the card reader portion 20. The card reader portion 20 can also be used to read a memory medium which has stored data from a digital still camera, and then output the digital data to the computer. In other words, the digital image scanner and the digital still camera may share a card reader installed in the digital image scanner. Nevertheless, in many cases, a digital image scanner and a digital still camera are not used at the same place and connected with the same computer. Under this circumstance, it is inconvenient to use the card reader portion of the digital image scanner to read the data stored in the removable memory medium of the digital still camera. It is understood that a cumbersome and weighty image scanner cannot always accompany the digital still camera just for providing the card reader to be used by the digital still camera. Therefore, an additional card reader may still be required so as to bother the user and waste the resource.

SUMMARY OF THE INVENTION

Therefore, the present invention provides an image processing apparatus having a scanner portion and a removable card reader portion to provide both the scanning and the card-reading functions, which also allows the card reader to be used by another device without the simultaneous presence of the scanner portion.

In accordance with an aspect of the present invention, there is provided an image processing apparatus. The image processing apparatus includes a scanner portion and a reader portion. The scanner portion is used for converting an image data of a scanned object into a digital data to be processed by a first computer. The reader portion is detachably installed in a receptacle of the scanner portion for receiving a storage medium with stored data therein, wherein the reader portion has a first connector and a second connector thereon. When the reader portion is installed in the receptacle to be electrically connected with the scanner portion, the data are transferred to the first computer via the scanner portion. When the reader portion is detached from the receptacle and has the second connector thereof electrically connected with a second computer, the data are transferred to the second computer.

Preferably, the storage medium is a memory card.

Preferably, the storage medium is one selected from a group consisting of CompactFlash card, SmartMedia card and Memory Stick.

Preferably, the second connector is a universal serial bus (USB) port.

In accordance with another aspect of the present invention, there is provided a storage medium reader for use with a scanner. The storage medium reader includes a main body, a first connector and a second connector. The main body has a slot for receiving a storage medium. The first connector is electrically connected with a scanner linking to a first computer when the storage medium reader is installed in a receptacle of the scanner for transferring data to the first computer via the scanner. The second connector is used to be electrically connected with a second computer for outputting data to the second computer when the storage medium reader is detached from the receptacle.

In accordance with another aspect of the present invention, there is provided an image processing apparatus. The image processing apparatus includes a scanner portion and a reader portion. The scanner portion is used for converting an image data of a scanned object into a digital data to be processed by a first computer, wherein the scanner portion is accommodated in a first housing and including a first connector in the first housing. The reader portion is used for receiving a storage medium to read out stored data therein. The reader portion has a second housing detachably inserted into the first housing of the scanner portion, has a second connectors on a first surface of the second housing to be electrically connected with the first connected for transferring the digital data to the first computer via the scanner portion, and has a third connector on a second surface of the second housing to be electrically connected with a second computer to output the digital data to the second computer.

Preferably, the third connector is a universal serial bus (USB) port

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
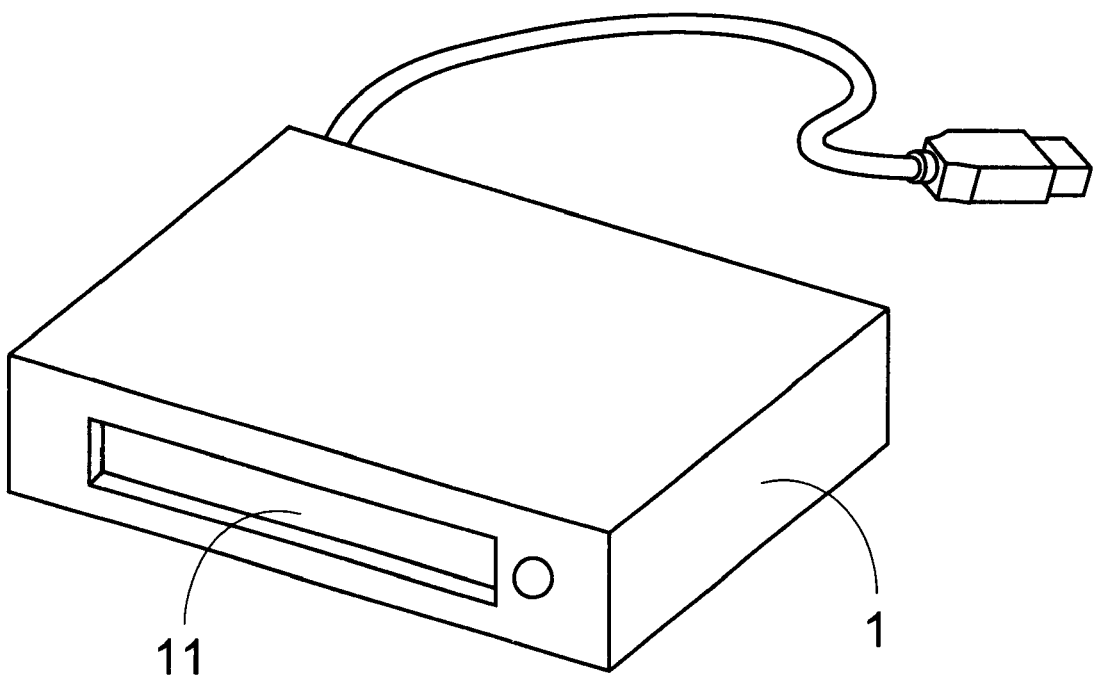
FIG. 1 is a schematic diagram illustrating a typical card reader.
Figure 2:
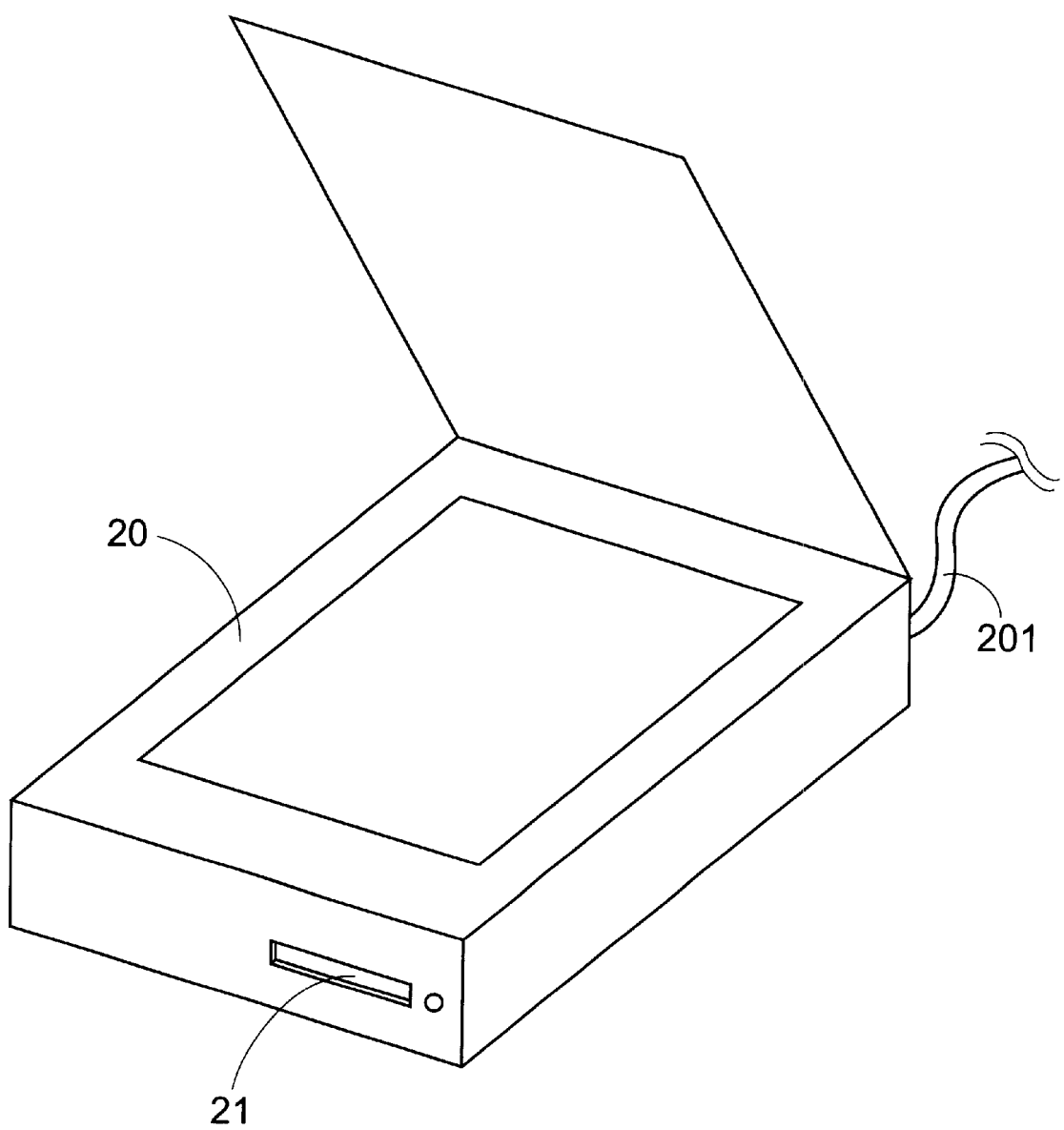
FIG. 2 is a schematic diagram illustrating a digital image scanner having a scanner portion and a card reader portion according to prior art.
Figure 3:
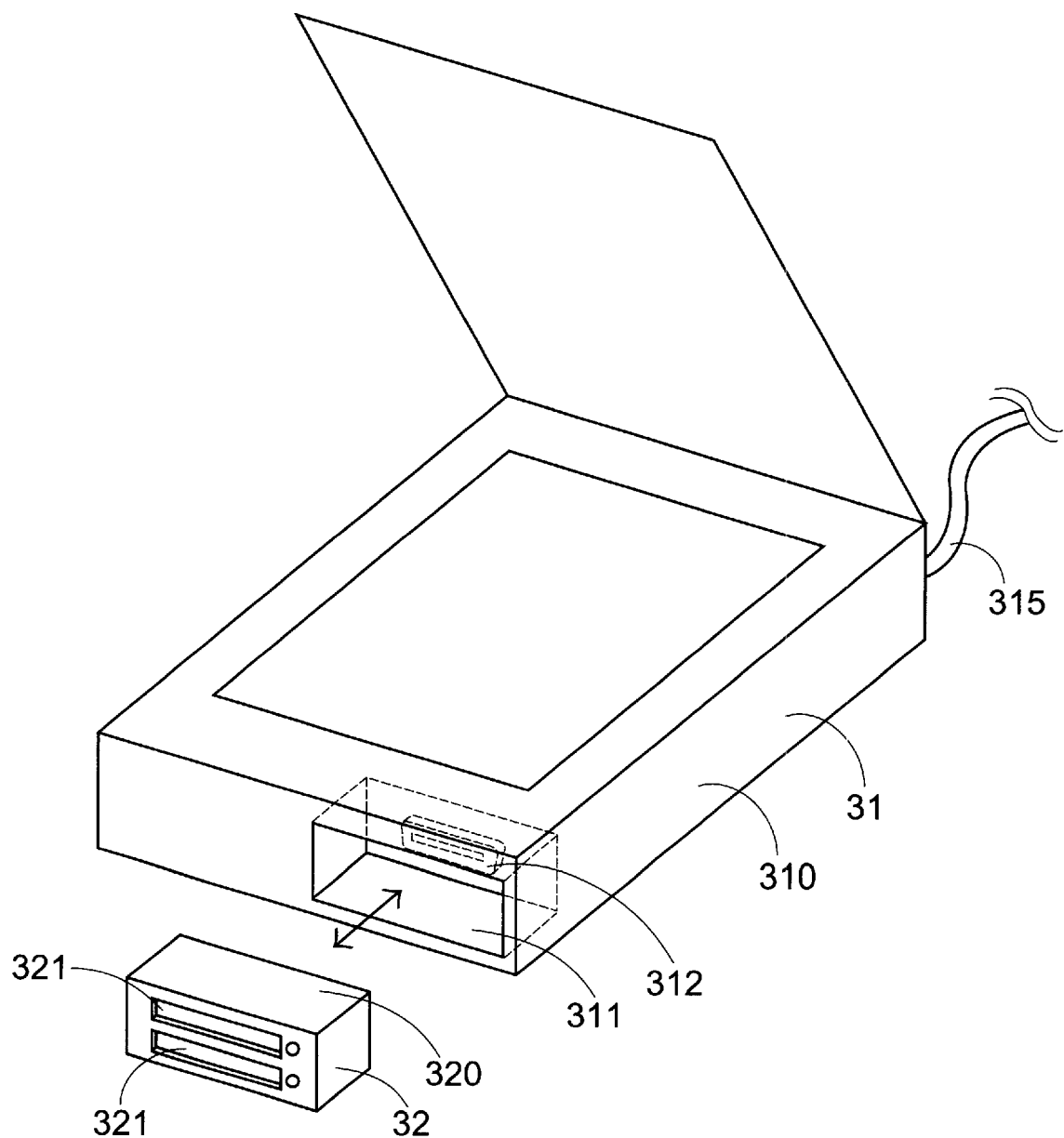
FIG. 3 is a schematic diagram illustrating a digital image scanner having a scanner portion and a removable reader portion according to a preferred embodiment of the present invention.

Please refer to FIG. 3. The image processing apparatus of the present invention includes a scanner portion 31 and a reader portion 32. The scanner portion 31 is used for converting an image data of a scanned object into a digital data. Such digital data will be transmitted to and further processed by a computer (not shown) via a cable 315. The scanner portion 31 has a receptacle 311 and a connector 312 mounted in the receptacle 311. The reader portion 32 has a housing 320 independent from the housing 310 of the scanner portion 31, and is detachably installed in the receptacle 311 of the scanner portion 31 and has at least one slot 321 in the main body thereof for receiving a storage medium with stored data therein. Moreover, the reader portion 32 is capable of reading out stored data in the storage medium. Preferably, the memory medium includes but is not limited to CompactFlash card (Compact Flash Association), SmartMedia card (Toshiba Corporation) and Memory Stick (Sony Corporation), etc. The circuitry and principle of the scanner portion 31 and the reader portion 32 are well known in the art and need not be further described in details herein.

Figure 4:
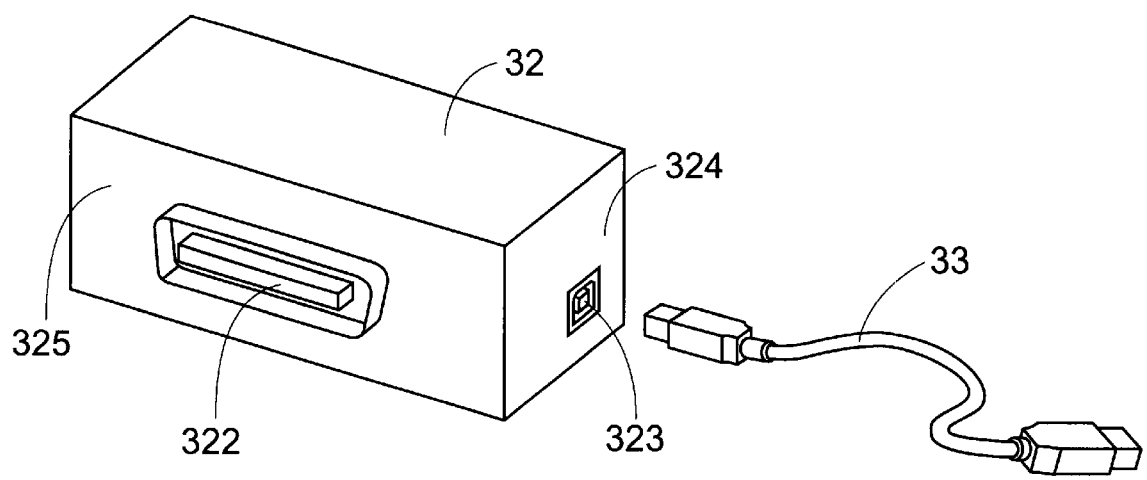
FIG. 4 is a schematic diagram of the reader portion of FIG. 3.

FIG. 4 schematically shows the rear side of the reader portion 32. The reader portion 32 has two connectors 322 and 323 arranged on two surfaces 324 and 325 thereof, respectively. The connector 322 matches the connector 312 of the scanner portion 31. When the reader portion 32 is installed in the receptacle 311 of the scanner portion 31 and thus the connectors 322 and 312 are coupled with each other, the data are transferred to the computer via the scanner portion 31. The connector 323, in this embodiment, is a universal serial bus (USB) port. Thus, when the reader portion 32 is detached from the receptacle 311, the data could be transferred to the computer (or another computer) via a USB cable 33 by electrically coupling the connector 323 with a corresponding USB port of the computer.

It is found that the image apparatus of the present invention has both the scanning and the card-reading functions, which is convenient to read the data stored in the removable memory medium of the digital still camera. In additional, the reader portion is removable for a user to carry and could be operated without the simultaneous presence of the scanner portion. Therefore, an additional card reader may be excluded so as to reduce cost.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image processing apparatus comprising:

a scanner portion for converting an image data of a scanned object into a digital data to be processed by a first computer; and a reader portion detachably installed in a receptacle of said scanner portion for receiving a storage medium with stored data therein, said reader portion having a first connector and a second connector thereon, wherein when said reader portion is installed in said receptacle to be electrically connected with said scanner portion, said data are transferred to said first computer via said scanner portion, and when said reader portion is detached from said receptacle and has said second connector thereof electrically connected with a second computer, said data are transferred to said second computer.

2. The image processing apparatus according to claim 1 wherein said storage medium is a memory card.

3. The image processing apparatus according to claim 2 wherein said storage medium is one selected from a group consisting of CompactFlash card, SmartMedia card and Memory Stick.

4. The image processing apparatus according to claim 1 wherein said second connector is a universal serial bus (USB) port.

5. A storage medium reader for use with a scanner comprising:

a main body having a slot for receiving a storage medium;

a first connector electrically connected with a scanner linking to a first computer when said storage medium reader is installed in a receptacle of said scanner for transferring data to said first computer via said scanner; and a second connector to be electrically connected with a second computer for outputting data to said second computer when said storage medium reader is detached from said receptacle.

6. The storage medium reader according to claim 5 being selected from a group consisting of CompactFlash card, SmartMedia card and Memory Stick.

7. The storage medium reader according to claim 5 wherein said second connector is a universal serial bus (USB) port.

8. An image processing apparatus comprising:

a scanner portion for converting an image data of a scanned object into a digital data to be processed by a first computer, said scanner portion being accommodated in a first housing and including a first connector in said first housing; and a reader portion for receiving a storage medium to read out stored data therein, said reader portion having a second housing detachably inserted into said first housing of said scanner portion, having a second connector on a first surface of said second housing to be electrically connected with said first connector for transferring said digital data to said first computer via said scanner portion, and having a third connector on a second surface of said second housing to be electrically connected with a second computer to output said digital data to said second computer.

9. The image processing apparatus according to claim 8 wherein said storage medium is a memory card.

10. The image processing apparatus according to claim 9 wherein said storage medium is one selected from a group consisting of CompactFlash card, SmartMedia card and Memory Stick.

11. The image processing apparatus according to claim 9 wherein said third connector is a universal serial bus (USB) port.

* * * * *